United States Patent
Chen (10) Patent No.: US 7,489,655 B2
(45) Date of Patent: Feb. 10, 2009

(54) METHOD AND APPARATUS FOR PREDICTIVE SCHEDULING IN A BI-DIRECTIONAL COMMUNICATION SYSTEM

(75) Inventor: Tao Chen, San Diego, CA (US)

(73) Assignee: QUALCOMM, Incorporated

( * ) Notice: Subject to any disclaimer, the term of this patent is extended or adjusted under 35 U.S.C. 154(b) by 740 days.

(21) Appl. No.: 09/900,272

(22) Filed: Jul. 6, 2001

(65) Prior Publication Data

US 2003/0007466 A1     Jan. 9, 2003

(51) Int. Cl.
  *H04J 3/00*       (2006.01)
(52) U.S. Cl. ...................................... 370/329
(58) Field of Classification Search ................ 370/331, 370/468, 329; 455/442
  See application file for complete search history.

(56) References Cited

U.S. PATENT DOCUMENTS

| | | | |
|---|---|---|---|
| 4,901,307 A | 2/1990 | Gilhousen et al. | |
| 5,056,109 A | 10/1991 | Gilhousen et al. | |
| 5,103,459 A | 4/1992 | Gilhousen et al. | |
| 5,414,796 A | 5/1995 | Jacobs et al. | |
| 5,504,773 A | 4/1996 | Padovani et al. | |
| 5,914,950 A | 6/1999 | Tiedemann, Jr. et al. | |
| 5,923,650 A | 7/1999 | Chen et al. | |
| 6,574,211 B2 | 6/2003 | Padovani et al. | |
| 6,801,512 B1 * | 10/2004 | Cudak et al. | 370/332 |
| 2001/0029178 A1 * | 10/2001 | Criss et al. | 455/419 |

FOREIGN PATENT DOCUMENTS

| | | |
|---|---|---|
| CN | 1263675 | 8/2000 |
| CN | 1301470 | 6/2001 |
| WO | 96/37081 | 11/1996 |
| WO | 98/35514 | 8/1998 |
| WO | 99/66748 | 12/1999 |

OTHER PUBLICATIONS

International Search Report—PCT/US02/021040, International Search Authority European Patent Office, Jul. 31, 2003.
TIA/EIA/IS-707-A.8, "Data Service Options for Spread Spectrum Systems: radio Link Protocol Type 2".
TIA/EIA/IS-707-A.8, "Data Service Options for Spread Spectrum Systems: radio Link Protocol type 2", undated.

* cited by examiner

*Primary Examiner*—Melvin Marcelo
(74) *Attorney, Agent, or Firm*—Darrell Scott Juneau; Thomas R. Rouse (57) ABSTRACT

Method and apparatus for predictive scheduling in a bi-directional communication system are disclosed. In a communication system (100), a control unit (218) has knowledge that a subscriber station (106) will have data to be transmitted at an ascertainable time in the future. The control unit in the communication system utilizes the knowledge to schedule the data transmission without the need for the subscriber station to transmit to request schedule for the transmission.

27 Claims, 4 Drawing Sheets

METHOD AND APPARATUS FOR PREDICTIVE SCHEDULING IN A BI-DIRECTIONAL COMMUNICATION SYSTEM

BACKGROUND

1. Field

The present invention relates generally to communication systems, and more specifically to a method and an apparatus for predictive scheduling in a bi-directional communication system.

2. Background

Communication systems have been developed to allow transmission of information signals from an origination station to a physically distinct destination station. In transmitting information signal from the origination station over a communication channel, the information signal is first converted into a form suitable for efficient transmission over the communication channel. Conversion, or modulation, of the information signal involves varying a parameter of a carrier wave in accordance with the information signal in such a way that the spectrum of the resulting modulated carrier is confined within the communication channel bandwidth. At the destination station the original information signal is replicated from the modulated carrier wave received over the communication channel. Such a replication is generally achieved by using an inverse of the modulation process employed by the origination station.

Modulation also facilitates multiple-access, i.e., simultaneous transmission and/or reception, of several signals over a common communication channel. Multiple-access communication systems often include a plurality of subscriber subscriber units requiring intermittent service of relatively short duration rather than continuous access to the common communication channel. Several multiple-access techniques are known in the art, such as time division multiple-access (TDMA), frequency division multiple-access (FDMA), and amplitude modulation multiple-access (AM). Another type of a multiple-access technique is a code division multiple-access (CDMA) spread spectrum system that conforms to the "TIA/EIA/IS-95 Mobile Station-Base Station Compatibility Standard for Dual-Mode Wide-Band Spread Spectrum Cellular System," hereinafter referred to as the IS-95 standard. The use of CDMA techniques in a multiple-access communication system is disclosed in U.S. Pat. No. 4,901,307, entitled "SPREAD SPECTRUM MULTIPLE-ACCESS COMMUNICATION SYSTEM USING SATELLITE OR TERRESTRIAL REPEATERS," and U.S. Pat. No. 5,103,459, entitled "SYSTEM AND METHOD FOR GENERATING WAVEFORMS IN A CDMA CELLULAR TELEPHONE SYSTEM," both assigned to the assignee of the present invention.

A multiple-access communication system may be a wireless or wire-line and may carry voice and/or data. An example of a communication system carrying both voice and data is a system in accordance with the IS-95 standard, which specifies transmitting voice and data over the communication channel. A method for transmitting data in code channel frames of fixed size is described in detail in U.S. Pat. No. 5,504,773, entitled "METHOD AND APPARATUS FOR THE FORMATTING OF DATA FOR TRANSMISSION", assigned to the assignee of the present invention. In accordance with the IS-95 standard, the data or voice is partitioned into code channel frames that are 20 milliseconds wide with data rates as high as 14.4 Kbps. Additional examples of a communication systems carrying both voice and data comprise communication systems conforming to the "3rd Generation Partnership Project" (3GPP), embodied in a set of documents including Document Nos. 3G TS 25.211, 3G TS 25.212, 3G TS 25.213, and 3G TS 25.214 (the W-CDMA standard), or "TR-45.5 Physical Layer Standard for cdma2000 Spread Spectrum Systems" (the IS-2000 standard).

An example of a data only communication system is a high data rate (HDR) communication system that conforms to the TIA/EIA/IS-856 industry standard, hereinafter referred to as the IS-856 standard. The HDR system is based on a communication system disclosed in co-pending application Ser. No. 08/963,386, entitled "METHOD AND APPARATUS FOR HIGH RATE PACKET DATA TRANSMISSION," filed Nov. 3, 1997, assigned to the assignee of the present invention. The HDR communication system defines a set of data rates, ranging from 38.4 kbps to 2.4 Mbps, at which an access point (AP) may send data to a subscriber station (access terminal, AT). Because the AP is analogous to a base station, the terminology with respect to cells and sectors is the same as with respect to voice systems.

In a multiple-access communication system, communications between users are conducted through one or more base stations. A first user on one subscriber station communicates to a second user on a second subscriber station by transmitting data on a reverse link to a base station. The base station receives the data and can route the data to another base station. The data is transmitted on a forward link of the same base station, or the other base station, to the second subscriber station. The forward link refers to transmission from a base station to a subscriber station and the reverse link refers to transmission from a subscriber station to a base station. Likewise, the communication can be conducted between a first user on one mobile subscriber station and a second user on a landline station. A base station receives the data from the user on a reverse link, and routes the data through a public switched telephone network (PSTN) to the second user. In many communication systems, e.g., IS-95, W-CDMA, IS-2000, the forward link and the reverse link are allocated separate frequencies.

The design of a multiple-access communication system causes each transmitting subscriber station to act as an interference to other subscriber stations in the network. Therefore, the reverse link capacity is limited by the total interference which a subscriber station experiences from other subscriber stations. The amount of interference is affected by the mode of operation of the communication system—speech, data, or speech and data.

The amount of speech activity at any given moment is non-deterministic. In addition, there is typically no correlation in the level of speech activities among users. Therefore, the total power received at the base station from all transmitting subscriber stations varies over time and can be approximated as a Gaussian distribution. During periods of active speech, the subscriber station transmits at higher power and causes more interference to other subscriber stations. More interference increases the probability of frame errors in the voice data received by the base station. Therefore, the capacity, i.e., the number of users able to have access to the communication system is limited so that only a small portion of the transmitted frames is lost through excessive interference. In contrast, data communication is typically characterized by long period of inactivity, or low activity, punctuated by high bursts of data traffic that drastically decrease the communication system capacity.

Because of the variations in the level of voice activities, and the transmission of data traffic concurrently with the voice traffic, the demand for the reverse link continuously changes over time. To avoid degradation in the quality of the voice communication, the utilization of the reverse link should be dynamically adjusted to match the available reverse link capacity of the base station.

One method of minimizing the interference and maximizing the reverse link capacity is to control the transmit power of each subscriber station. For example, the communication system in accordance with the IS-95 standard utilizes two control loops. The first power control loop adjusts the transmit power of the subscriber station such that the signal quality, as measured by the energy-per-bit-to-noise-plus-interference ratio, $E_b/(N_o+I_o)$, of the signal received at the cell is maintained at a constant level. This level is referred to as the $E_b/(N_o+I_o)$ set point. The second power control loop adjusts the set point such that the desired level of performance, as measured by the frame-error-rate (FER), is maintained. The power control mechanism for the reverse link in IS-95 is disclosed in detail in U.S. Pat. No. 5,056,109, entitled "METHOD AND APPARATUS FOR CONTROLLING TRANSMISSION POWER IN A CDMA CELLULAR MOBILE TELEPHONE SYSTEM", assigned to the assignee of the present invention.

In accordance with another method, each subscriber station transmits at a different bit rate depending on the level of speech activity in the conversation of a user on the subscriber station. A variable rate speech vocoder provides speech data at full rate when the user is actively speaking and at low rate during periods of silence, e.g., pauses. The variable rate vocoder is described in detail in U.S. Pat. No. 5,414,796, entitled "VARIABLE RATE VOCODER," assigned to the assignee of the present invention.

In yet another method, differences between voice services and data services are utilized. A significant difference between voice services and data services is the fact that the former imposes stringent and fixed delay requirements. Typically, the overall one-way delay of speech frames must be less than 100 ms. In contrast, the data delay can become a variable parameter used to optimize the efficiency of the data communication system. Consequently, the reverse link can be continuously monitored and the data transmission dynamically scheduled so that the reverse link capacity is not exceeded. Several scheduling methods are known in the art. Examples of scheduling methods are disclosed in detail in U.S. Pat. No. 5,914,950, entitled "METHOD AND APPARATUS FOR REVERSE LINK RATE SCHEDULING", and in U.S. Pat. No. 5,923,650 entitled "METHOD AND APPARATUS FOR REVERSE LINK RATE SCHEDULING", both assigned to the assignee of the present invention.

Because scheduling method has a profound effect on the performance of a communication system, there is a need in the art for improving scheduling methods and, consequently, utilization of the reverse link.

SUMMARY

Embodiments disclosed herein address the above-stated needs by taking advantage of knowledge at a scheduler on a communication system that a subscriber station will have data to be transmitted to a base station at an ascertainable time in the future.

In one aspect of the invention, a scheduling of transmissions on a link in a communication system comprises transmitting data on a first link in the communication system; and transmitting scheduling information on the first link in the communication system. In one embodiment, the data and the scheduling information are transmitted together.

In another aspect of the invention, a scheduling of transmissions on a link in a communication system comprises transmitting data on a first link in the communication system; and scheduling transmission on the link in the communication system in accordance with the reception of the transmitted data. In one embodiment, the link capacity for a base station expecting the scheduled transmission on the link in the communication system in accordance with the reception of said transmitted data is ascertained, and a change to at least one parameter of pre-scheduled information when the ascertained reverse link capacity does not support said scheduled transmission is transmitted on the first link in the communication system. In another embodiment, the change to at least one parameter of pre-scheduled information is transmitted together with the transmitted data.

In yet another aspect, the scheduling of transmissions on a link in a communication system comprises ascertaining the link capacity at a base station expecting the pre-scheduled transmission of data on the link; and proceeding in accordance with the ascertained link capacity. In one embodiment, transmitting scheduling information on the first link is abstained from when the ascertained reverse link capacity supports the pre-scheduled transmission of data. In another embodiment, confirmation for the pre-scheduled transmission of data on the first link is transmitted when said ascertained reverse link capacity supports the pre-scheduled transmission of data. When said ascertained reverse link capacity does not support the pre-scheduled transmission of data, re-scheduling information is transmitted on the first link.

DETAILED DESCRIPTION

The word "exemplary" is used exclusively herein to mean "serving as an example, instance, or illustration." Any embodiment described herein as "exemplary" is not necessarily to be construed as preferred or advantageous over other embodiments.

The term packet is used exclusively herein to mean a group of bits, including data (payload) and control elements, arranged into a specific format. The control elements comprise, e.g., a preamble, a quality metric, or other metrics known to one skilled in the art. Quality metric comprises, e.g., a cyclical redundancy check (CRC), a parity bit, or other metrics known to one skilled in the art.

The term base station, referred to herein as an AP in the case of an HDR communication system, is used exclusively herein to mean the hardware with which subscriber stations communicate. "Cell" refers to the hardware or a geographic coverage area, depending on the context in which the term is used. A sector is a partition of a cell. Because a sector has the attributes of a cell, the teachings described in terms of cells are readily extended to sectors.

The term subscriber station, referred to herein as an AT in the case of an HDR communication system, is used exclusively herein to mean the hardware with which an access network communicates. A subscriber station may be mobile or stationary. A subscriber station may be any data device that communicates through a wireless channel or through a wired channel, for example using fiber optic or coaxial cables. A subscriber station may further be any of a number of types of devices including but not limited to PC card, compact flash, external or internal modem, or wireless or wireline phone. A subscriber station that is in the process of establishing an active traffic channel connection with a base station is said to be in a connection setup state. A subscriber station that has established an active traffic channel connection with a base station is called an active subscriber station, and is said to be in a traffic state.

The term communication channel/link is used exclusively herein to mean a single route over which a signal is transmitted described in terms of modulation characteristics and coding, or a single route within the protocol layers of either the base station or the subscriber station.

The term reverse channel/link is used exclusively herein to mean a communication channel/link through which a subscriber station sends signals to a base station.

The term forward channel/link is used exclusively herein to mean a communication channel/link through which a base station sends signals to a subscriber station.

The term code channel frame is used exclusively herein to mean a group of bits arranged into a specific format within one frame time period.

The term soft hand-off is used exclusively herein to mean a communication between a subscriber station and two or more sectors, wherein each sector belongs to a different cell. In the context of IS-95 standard, the reverse link communication is received by both sectors, and the forward link communication is simultaneously carried on the two or more sectors' forward links.

The term softer hand-off is used exclusively herein to mean a communication between a subscriber station and two or more sectors, wherein each sector belongs to the same cell. In the context of the IS-95 standard, the reverse link communication is received by both sectors, and the forward link communication is simultaneously carried on one of the two or more sectors' forward links.

Description

Figure 1:
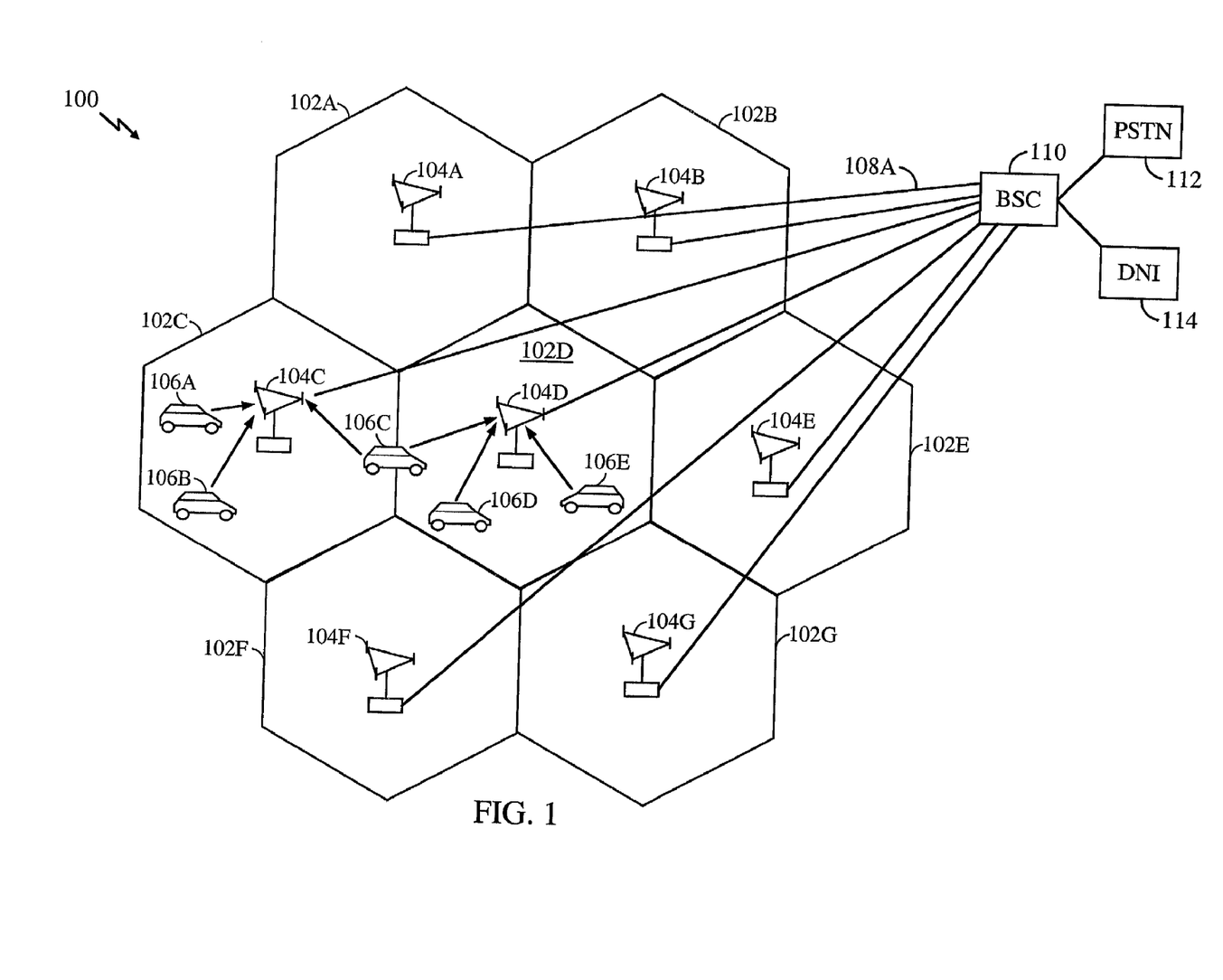
FIG. 1 illustrates a conceptual diagram of a communication system capable of performing scheduling in accordance with embodiments of the present invention.

FIG. 1. illustrates an exemplary communication system 100 capable of performing scheduling in accordance with embodiments of the present invention. The communication system is composed of multiple cells 102a-102g, each cell 102 being serviced by a corresponding base station 104. Within the CDMA network, various subscriber stations 106 are dispersed throughout the coverage area of the communication system 100. The subscriber stations 106 communicate with the base stations 106 by transmitting signals to the base stations 104 on a reverse link, and receiving signals from the base stations 104 on a forward link. For example, subscriber stations 106a and 106b communicate exclusively with base station 104c, subscriber stations 106d and 106e communicate exclusively with base station 104d, but subscriber station 106c, which is located near a cell boundary is in handoff with base stations 104c and 104d. In one embodiment, the communication system 100 is a CDMA communication system, although the present invention is applicable to all wireless communication formats. In a CDMA communication system, subscriber station 106c, which is located near a cell boundary, is in a soft handoff with base stations 104c and 104d. The use of soft handoff in a CDMA system is described in detail in the aforementioned U.S. Pat. No. 5,267,261. The base stations 106 are connected over a corresponding backhaul 108 to a controller 110. The controller 110 interfaces with a public switched telephone network (PSTN) 112 and a data network interface (DNI) 114.

Figure 2:
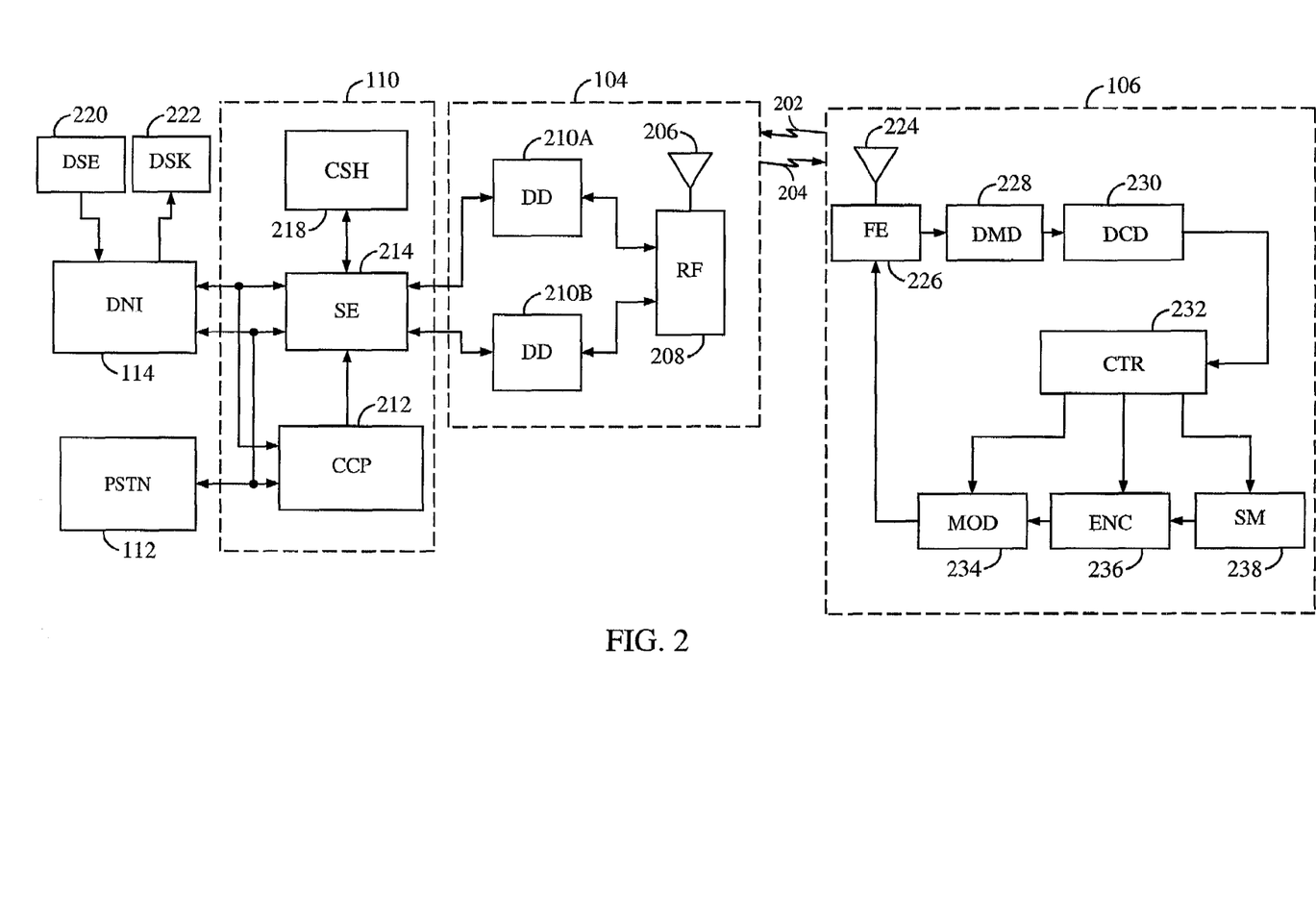
FIG. 2 represents a block diagram of a basic architecture of the communication system of FIG. 1.

FIG. 2 represents a block diagram of a basic architecture of the communication system 100 in more detail in accordance with one embodiment. For simplicity, only one base station 104 and one subscriber station 106 are illustrated in FIG. 2. Initially, a subscriber station 106, e.g. 106a, establishes a communication link with the base station 104c using a predetermined access procedure.

The voice call access procedure at the subscriber station 106 starts by the subscriber station 106a transmitting a request message to base station 104c on the reverse link 202. The base station 104c receives the message at the antenna 206 and provides the message to a radio-frequency (RF) unit 208. The RF unit 208 filters, amplifies, downconverts, and quantizes the reverse link signal and provides a digitized baseband signal to one of channel elements 210, e.g., 210a. (For simplicity, only two channel elements are shown.) The channel element 210a demodulates and decodes the baseband signal, and provides the decoded data, containing the request command to the controller 110.

The decoded data at the controller 110 are forwarded to a call control processor (CCP) 212. The call control processor 212 selects one of selector elements (SE) 214, and sends to the selected selector element 214a a command to direct base station 104c to assign a forward link traffic channel. (For simplicity, only one selector element is shown.) Base station 104c uses the channel element 210a to control the call with subscriber station 106a. After the forward traffic channel has been assigned, call control processor 212 is informed. The call control processor 212 then commands base station 104c to transmit a channel assignment message to subscriber station 106a on the forward link 204, and to configure the selector element 214 to interface the forthcoming voice call to the PSTN 112.

The subscriber station 106a receives the forward link signal 204 on an antenna 224 and routes the forward link signal 204 to a front end (FE) 226. The front end 226 filters, amplifies, downconverts, and quantizes the received signal and provides a resultant digitized baseband signal to demodulator (DMD) 228. The digitized baseband signal is demodulated by demodulator 228 and decoded by a decoder (DCD) 230. The decoded data, which contains the channel assignment message, is routed to a controller (SCTR) 232. The controller 232 receives the channel assignment message and configures the subscriber station 106a to voice call data transmission.

The data transmission procedure from the subscriber station 106 starts by a data source (DSM) 238 at the mobile station 106a indicating that data is present for transmission to a controller (MCTR) 232. The controller 232 can be implemented in a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. The controller 232 may contain a memory (external or internal to the controller 232) that can be implemented using a storage element or one of any number of memory devices, such as RAM memory devices, latches, or other types of memory devices, that are known in the art. The controller 232 processes the indication by routing a request command to an encoder (ENC) 236. The encoder 236 encodes the request command and provides the encoded request to a modulator (MOD) 234. Modulator 234 modulates the signal with the selected modulation scheme, and provides the modulated signal to the front end 226. The front end 226 filters, amplifies, and transmits the signal over the air, through antenna 224, on the reverse link 202.

The base station 104c receives the request at the antenna 206 and provides the request to the RF unit 208. The RF unit 208 filters, amplifies, downconverts, and quantizes the reverse link signal and provides a digitized baseband signal to one of channel elements 210, e.g., 210a. The channel element 210a demodulates and decodes the baseband signal, and provides the decoded data, containing the request command to the controller 110.

The decoded data at the controller 110 is forwarded to a channel scheduler (CSH) 218. The channel scheduler 218, connected to all selector elements 214 within base station controller 110, assigns the maximum scheduled transmission rate that can be used by the subscriber station 106c for high speed data transmission on the reverse link in accordance with a method described below. The maximum scheduled transmission rates for subscriber station 106 is provided to one of the selector elements 214. Selector element 214 routes the scheduling information to one of the channel elements 210, which encodes and modulates the scheduling information. The modulated signal is provided to the RF unit 208, which upconverts, filters, and amplifies the signal. The signal is transmitted by antenna over forward link 202. The selector element 214 is configured to interface the forthcoming data to the DNI 114.

At the subscriber station 106c, the forward link signal is received by the antenna 60 and processed in the same manner as described with regard to a voice call. The decoded data, which contains the maximum scheduled transmission rate, is routed to the controller 232. The controller 232 receives the scheduling information and configures the hardware to begin data transmission at or below the maximum scheduled transmission rate.

In one embodiment, high speed data transmission occurs in essentially the same manner as that described above for transmission of the request command, with the exception that data transmission can occur at rates up to the maximum scheduled transmission rate. At the subscriber station 106c, the data is partitioned into data frames. In this specification, a data frame refers to the amount of data which is transmitted from subscriber station 106 to base station 104 within one frame time period. The data frame can be further partitioned into smaller units called data portions. The data frames are sent from a data source 238 to an encoder 236. Encoder 236 formats the data frames. In one embodiment, a method for encoding and interleaving the data as described in detail in the aforementioned U.S. Pat. No. 5,504,773 is used. The encoded data frames are provided to a modulator 234, which modulates the data, and provides the modulated data to the front end 226. The front end 226 filters, amplifies, upconverts and transmits the signal over the air through antenna 224 on the reverse link 204.

The base station 104c receives the reverse link signal and demodulates and decodes the reverse link signal in the manner described above. The decoded data is provided by a channel element 210 to a selector element 210. Selector element 214 provides the data to packet network interface 114, which routes the data to data sink 222.

Considering the description above, the reverse link transmission is carried out in two modes consistent with the characteristics of voice and data communication as discussed. In the first mode, the communication between base stations 104 and subscriber stations 106 is not scheduled because of intolerance to additional processing delay. This mode includes voice communications. In the second mode, the communication between base stations 104 and subscriber stations 106 is scheduled, and includes data communications, which can tolerate additional processing and queuing delay.

One of ordinary skill in the art would understand that the previous description is meant to describe basic access procedures. Consequently, the access procedures described, as well as functions and blocks performing the functions, can also be accomplished by other implementations. Thus, for example, the locations of channel scheduler 218 and selector element 214 depend on whether a centralized or distributed scheduling processing is desired. For example, channel scheduler 218 and selector element 214 can be included within base stations 104. This distributed processing allows each base station 104 to perform its own scheduling, thereby possibly minimizing the processing delay. Conversely, channel scheduler 218 can be designed to control communication with all base stations 104 in the communication system. This centralized processing may result in the optimal utilization of system resources. However, centralized scheduling is more complex because of the various interactions between the cells and subscriber stations 106. In an alternative embodiment, specifically applicable to CDMA communication systems, to simplify the scheduling, the scheduled tasks can be divided into two categories: scheduled tasks for subscriber stations 106 which are in soft handoff and scheduled tasks for subscriber stations 106 which are not in soft handoff. In the alternative embodiment, the reverse link rate scheduling for subscriber stations 106, that are in communication with only one cell can be performed at the cell level. Subscriber stations 106, which are in communication with multiple cells can be scheduled by a central channel scheduler 218. The present invention incorporates all embodiments of the forward link rate scheduling, including centralized scheduling, distributed scheduling, and any combinations thereof.

In one embodiment, the channel scheduler 218 is tasked with the function of assigning the data transmission rate to each subscriber station 106 within the communication system 100 such that a set of goals is optimized. These goals include, but are not limited to: (1) improved utilization of the reverse link capacity by transmitting as many scheduled and unscheduled tasks as can be supported within system capacity constraints, (2) improved quality in the communication and minimized transmission delay, (3) fair allocation of the reverse link capacity to all scheduled users based on a set of priorities, and (4) minimized transmit power of subscriber station 106 to extend battery life and reduce interference. The goals are optimized by balancing a list of factors, which in general depend on an implementation of the communication system 100. A discussion of factors pertaining to a CDMA communication system is detailed in the aforementioned U.S. Pat. Nos. 5,914,950 and 5,923,659.

In certain situations, the scheduler 218 has an advanced knowledge that a subscriber station 106 will have data to be transmitted on the reverse link at an ascertainable time in the future. In accordance with an embodiment, the scheduler utilizes this knowledge to optimize the set of goals by scheduling a transmission on the reverse link without a request for such a scheduling from the subscriber station 106. The knowledge may be based on an existence of a feedback relationship. The knowledge may also be based on an existence of pre-scheduled transmission from the subscriber station 106.

An example of the feedback relationship is an Automatic Retransmission reQuest (ARQ) method, often used at the link layer of communication systems to detect missing or erroneously received information at the receiving terminal, and request retransmission of this information at the transmitting terminal. An example of such an ARQ is a Radio Link Protocol (RLP), a class of error control protocols known as negative acknowledgement-based (NAK) ARQ protocols, which are well known in the art. One such RLP is described in TIA/EIA/IS-707-A.8, entitled "DATA SERVICE OPTIONS FOR SPREAD SPECTRUM SYSTEMS: RADIO LINK PROTOCOL TYPE 2", hereinafter referred to as RLP2. The existing link layer ARQ schemes achieve retransmission of missing or erroneously received packets by utilizing a sequence number unique to each packet. When a receiving terminal detects a packet with a sequence number higher than an expected sequence number, the receiving terminal declares packet(s) with sequence number(s) between the expected sequence number and the detected packet's sequence number missing or erroneously received. The receiving terminal then sends a control message requesting retransmission of the missing packets to a transmitting terminal. Alternatively, the transmitting terminal may resend the packet after a certain time out interval if the transmitting terminal has not received a positive acknowledgement from the receiving terminal. Consequently, existing link layer ARQ schemes cause a large delay between the first transmission of a packet and a subsequent retransmission. However, regardless of a particular ARQ scheme, the scheduler 218 has an advanced knowledge that a subscriber station 106 will need to transmit a feedback message at a certain time after the packet has been sent from the base station 104.

An example of a pre-scheduled transmission from the subscriber station 106 is when a sensor or a set of sensors, each connected to a corresponding subscriber station 106, is pre-scheduled to report accumulated data at a certain time. Therefore, the scheduler 218 has advanced knowledge that a subscriber station 106 will need to transmit the accumulated data at the pre-scheduled time.

Figure 3:
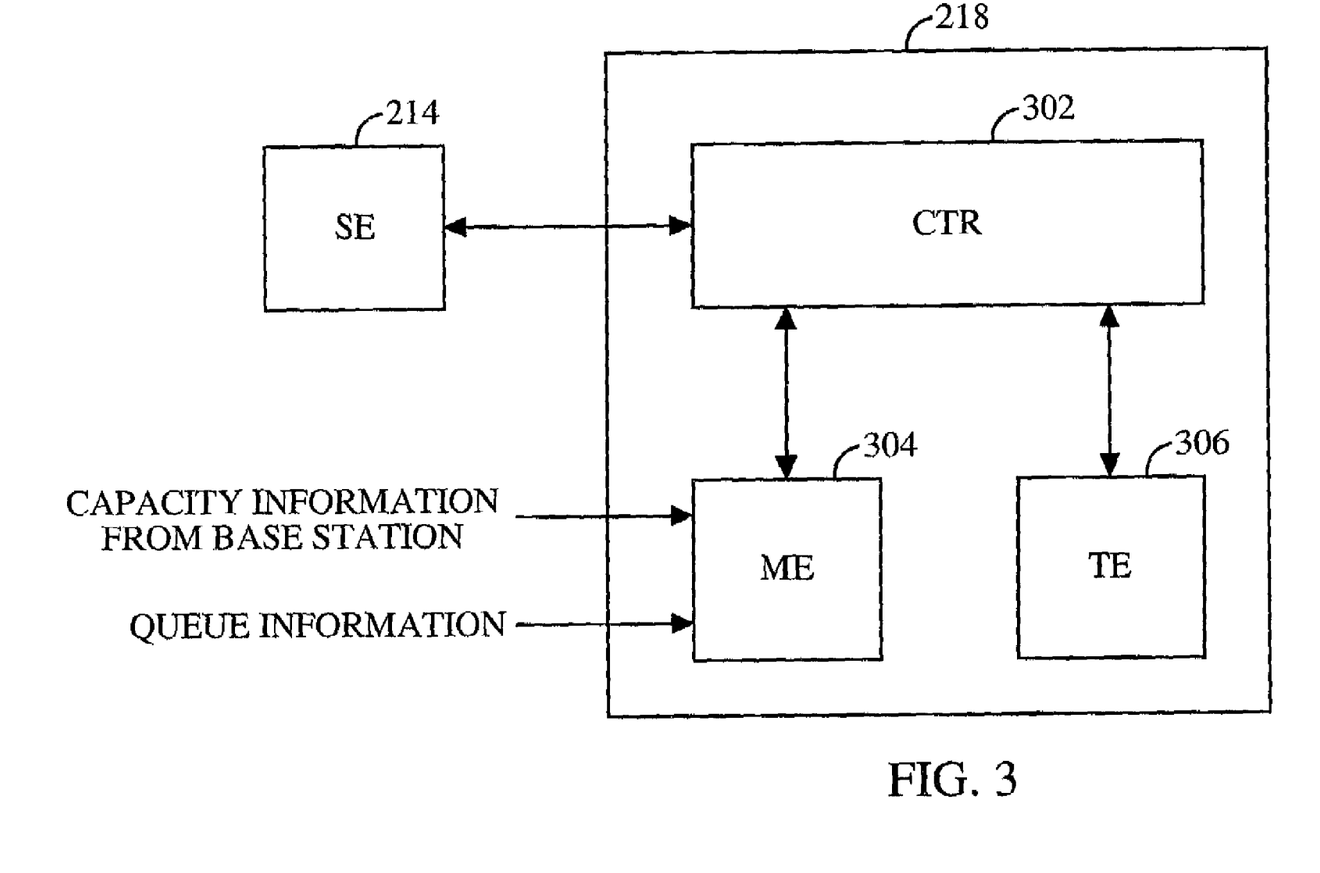
FIG. 3. illustrates a conceptual block diagram of a channel scheduler.

FIG. 3. illustrates a conceptual block diagram of channel scheduler 218 in accordance with an embodiment. A controller (CTR) 302 collects pertinent information, e.g., capacity and queue, from the base station(s) 104 in the communication system from FIG. 1, and stores the collected information in a memory element (ME) 304. The collected information may be retrieved by the controller 302 as needed. The controller 302 can be implemented in a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. Memory element 304 can be implemented using a storage element or one of any number of memory devices, such as RAM memory devices, latches, or other types of memory devices, that are known in the art. The controller 302 connects to all selector elements 214 within the base station controller 110. The controller 302 is also coupled to timing element (TE) 306. Timing element 306 can be implemented with a counter run by a system clock, an on-board oscillator locked to an external signal, or a storage element for receiving system timing from an external source. Timing element 306 provides controller 302 with timing signals necessary to perform the reverse link rate scheduling. The timing signals also allow controller 302 to send the scheduling information to selector element 214 at the appropriate interval.

Figure 4:
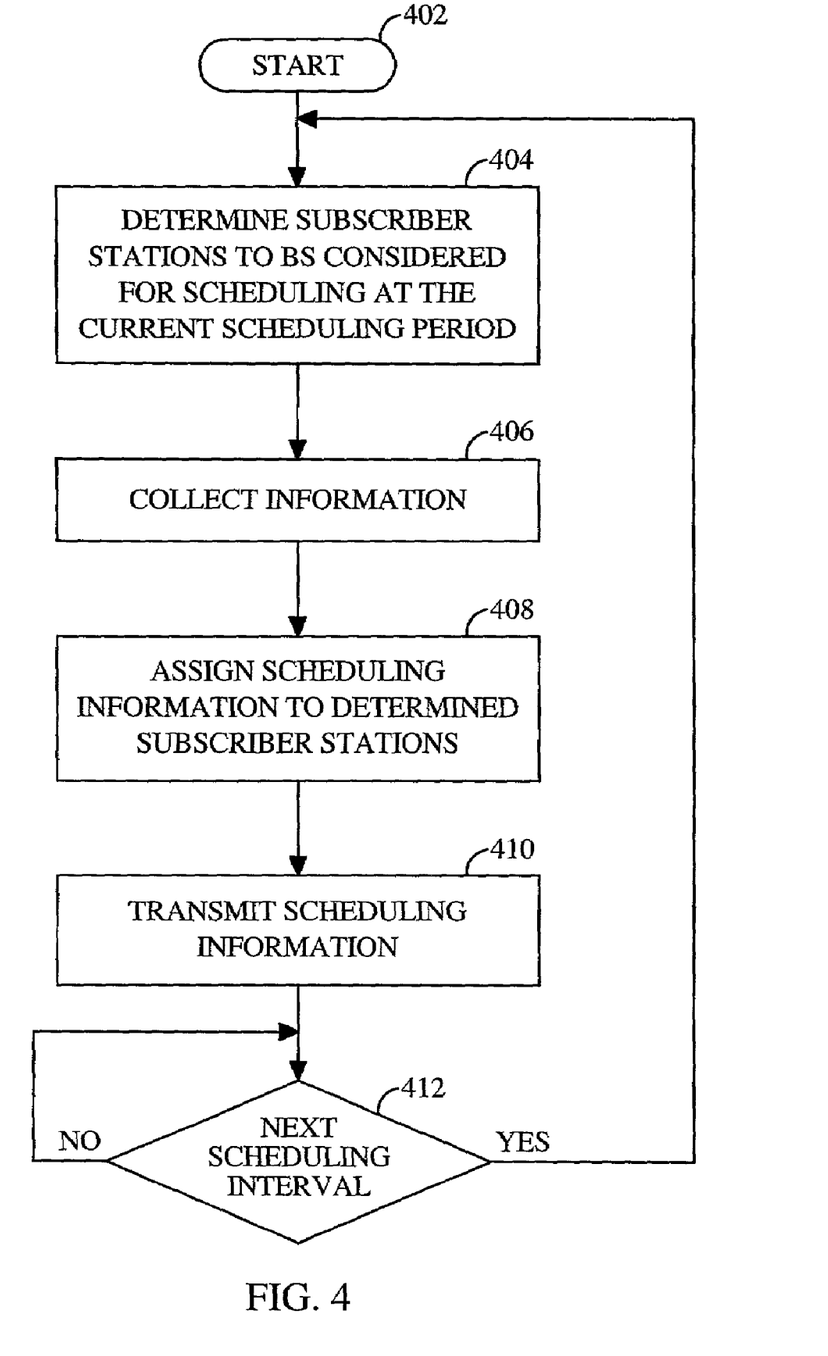
FIG. 4 illustrates a flow diagram of a reverse link rate scheduling method.

FIG. 4 illustrates a flow diagram of a reverse link rate scheduling method in accordance with one embodiment. The method starts in step 402.

In step 404, a scheduler determines which subscriber stations will have to be considered in the current scheduling period. Such subscriber stations comprise the subscriber stations that requested to be scheduled for a transmission on the reverse link by sending a request command. Such subscriber stations also comprise the subscriber stations that will be due for a transmission on the reverse link due to the occurrence of a certain event as discussed above. Because the scheduler is provided with time instances for the pre-scheduled transmission from the subscriber station, the current time, and the system parameter that determines how long before transmission a subscriber station sends the request command, the scheduler can determine when each of the pre-scheduled subscriber stations would send a request command. The scheduler also keeps track of the packets that were sent to base stations on the forward link, and can, therefore, determine based on a transmission delay and error statistics, when each of these base stations receives a packet that requires acknowledgement. Consequently, the scheduler can determine when each of these subscriber stations would send a request command.

In step 406, the scheduler collects all pertinent information necessary for the optimal scheduling assignment of the data transmission for each subscriber station that was determined in step 404. The pertinent information may include the number of scheduled and unscheduled tasks, the transmit power available to each subscriber station, the queue size indicating the amount of data to be transmitted by each subscriber station, the transmission rate for the unscheduled task for each determined subscriber station during the prior scheduling periods, the listing of base stations with which the subscriber station can communicate, the priority of subscriber stations, the total power received at each cell for the prior scheduling period, and other parameters known to one skilled in the art.

In step 408, the scheduler determines scheduling information for each scheduled subscriber station based on the collected information and the set of aforementioned goals. The scheduling information is dependent on the constraints of the communication system. Thus if the communication system supports a variable transmission rate on the reverse channel, the scheduling information may comprise a maximum transmission rate and time instance in which each of the scheduled subscriber station may transmit. Examples of such systems are a CDMA system, a GLOBALSTAR system, a time division multiple access (TDMA) system, or a frequency division multiple access (FDMA) system. The application of the present invention to a CDMA system or other variable rate communication systems, using the concept of a single variable rate channel, or multiple channels having a fixed rate, or a combination of variable and fixed rate channels, is within the scope of the present invention.

In one embodiment of the invention, certain subscriber stations do not need to send a request to transmit. The permission to transmit is implied from an occurrence of an event, a receipt of a packet requiring an acknowledgement, or incidence of a pre-scheduled time to transmit. In this embodiment, the scheduling information is pre-determined. Thus, for example, a subscriber station that received a packet requiring an acknowledgement will transmit acknowledgement data at a pre-determined transmission rate and a pre-determined time instance after receiving the packet. The scheduler may always modify the pre-determined scheduling information by transmitting new scheduling information.

In another embodiment of the invention, all subscriber stations are required to send a request command. The scheduler may transmit to certain subscriber stations scheduling information that contains a permission to transmit without the need for a request command.

In either embodiment, the scheduler may transmit a command requiring a subscriber station that was not required to send a request command to do so and vice versa.

Consequently, in step 410, the scheduler transmits the scheduling information to the subscriber station.

The reverse link rate scheduling in accordance with the following embodiments can be performed continuously, periodically, or in a staggered manner. If the scheduling is performed continuously or periodically, the scheduling interval is selected such that the reverse link capacity of the cells is fully utilized for the duration of the scheduling period. In accordance with the embodiments, the minimum period is a code data frame. As discussed, data to be sent is partitioned into data packets. The data packets are then encoded into code channel frames, and the code frames are transmitted.

In the first embodiment, the scheduling is performed every frame. This embodiment allows the channel scheduler to dynamically adjust the maximum scheduled transmission rate of the scheduled user at each frame to fully utilize the capacity available for each cell in the network. More processing is required to assign the scheduled information at each frame. Also, the scheduler collects all pertinent information more frequently.

In the second embodiment, the scheduling is performed every K frames, where K is an integer greater than one. On the reverse link, a scheduling delay exists from the time the data is made available to the subscriber station to the time of data transmission at the high speed transmission rate. In the exemplary embodiment, the scheduling delay can be up to several frames in length. The scheduling delay impacts the responsiveness of the channel scheduler to changes in the reverse link capacity and demand. When the reverse link is lightly loaded, allowing the subscriber station to transmit at any rate up to the maximum scheduled transmission rate, the scheduling delay is reduced. When a subscriber station has no more data to transmit, the subscriber station can immediately reduce the transmission rate and, thus, reduce the reverse link interference to other subscriber stations. Additionally, less overhead is required to transmit the scheduling information to the subscriber stations. Because a portion of the forward link resource is allocated to overhead, reducing transmission of the overhead is achieved. For example, if the scheduling interval is ten frames, the second embodiment requires slightly more than $\frac{1}{10}$ of the overhead of the first embodiment while still maintaining efficient utilization of the reverse link.

Alternately, in the third embodiment, the reverse link rate scheduling can be staggered. In this embodiment, the scheduling is triggered by certain events. For example, the channel scheduler can perform the reverse link rate scheduling whenever a request for high speed data transmission is received or whenever a scheduled high speed data transmission by the subscriber station is completed. The channel scheduler has knowledge of the amount of data to be transmitted by each subscriber station and the scheduled transmission rate. Thus, the channel scheduler is able to determine when the high speed data transmission is completed. Upon termination of a scheduled transmission by the subscriber station, the channel scheduler can perform the scheduling and allocate the reverse link capacity to other subscriber stations.

One skilled in the art recognizes that the embodiments can be combined, i.e., certain subscriber stations can be scheduled periodically on a frame or K-frame period, and other subscriber stations can be scheduled upon an event occurrence. For example, the channel scheduler has knowledge of the data packets to be transmitted to each subscriber station and the scheduled transmission rate. Consequently, the channel scheduler is able to determine when a particular subscriber station requests acknowledgement transmission, schedule the acknowledgement transmission, and transmit schedule information to the particular subscriber station. As discussed, this results in better resource utilization because the particular subscriber station does not need to request scheduling information. Furthermore, because the scheduler has access to the data packets, it can add the scheduling information to the data packet(s), and transmit the data packet(s) and the scheduling information together, thus achieving further resource savings.

Consequently, in step 412, the scheduler determines whether the next scheduling period has started. If the determination is negative, the method returns to step 412. Otherwise, the method returns to step 404 to restart the scheduling cycle.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

The invention claimed is:

1. A method for scheduling transmission on a link in a communication system, comprising:
    transmitting data on a first link in the communication system;
    determining a transmission schedule to transmit data based on a forthcoming event for at least one subscriber station due for a transmission of the data, before the subscriber station sends a request for transmission; and
    transmitting scheduling information on the first link in the communication system.

2. The method as claimed in claim 1, wherein said transmitting scheduling information on the first link in the communication system comprises:
    transmitting scheduling information together with said transmitted data on the first link in the communication system.

3. A method for scheduling transmission on a link in a communication system, comprising:
    transmitting data on a first link in the communication system;
    determining a transmission schedule to transmit data based on a forthcoming event for at least one subscriber station due for a transmission of the data, before the subscriber station sends a request for transmission; and
    scheduling transmission on the link in the communication system in accordance with a reception of said transmitted data on the first link.

4. The method as claimed in claim 3, wherein said scheduling transmission on the link in the communication system in accordance with a reception of said transmitted data on the first link comprises:
    scheduling transmission on the link in the communication system at a first time instance delayed by a pre-determined amount from a time instance of the reception of said transmitted data on the first link.

5. The method as claimed in claim 3, further comprising:
    ascertaining the link capacity at a base station expecting said scheduled transmission on the link in the communication system in accordance with the reception of said transmitted data on the first link; and
    transmitting, on the first link in the communication system, a change to at least one parameter of said scheduled transmission when said ascertained link capacity does not support said scheduled transmission.

6. The method as claimed in claim 5, wherein said transmitting, on the first link in the communication system, a change to at least one parameter of said scheduled transmission when said ascertained link capacity does not support said scheduled transmission comprises:
    transmitting, on the first link in the communication system, a change to at least one parameter of said scheduled transmission together with said transmitted data.

7. A method for scheduling transmission on a link in a communication system, comprising:
    ascertaining the link capacity at a base station expecting a pre-scheduled transmission of data on the link wherein a transmission schedule to transmit the data is based on a forthcoming event of at least one subscriber station due for a transmission of the data, before the subscriber station sends a request for transmission; and
    proceeding in accordance with said ascertained link capacity.

8. The method as claimed in claim 7, wherein said proceeding comprises:
    abstaining from transmitting scheduling information on a first link when said ascertained link capacity supports the pre-scheduled transmission of data.

9. The method as claimed in claim 8, further comprising:
    transmitting re-scheduling information on a first link when said ascertained link capacity does not support the pre-scheduled transmission of data.

10. The method as claimed in claim 7, wherein said proceeding comprises:
    transmitting, on the first link, authorization for the pre-scheduled transmission of data when said ascertained link capacity supports the pre-scheduled transmission of data.

11. The method as claimed in claim 10, further comprising:
    transmitting re-scheduling information on the first link when said ascertained link capacity does not support the pre-scheduled transmission of data.

12. An apparatus for scheduling transmission on a link in a communication system, comprising:
    a transmitter;
    a processor; and
    a storage medium coupled to the processor and containing a set of instructions executable by the processor to cause the transmitter to transmit data on a first link in the communication system, determine a transmission schedule to transmit data based on a forthcoming event for at least one subscriber station due for a transmission of the data, before the subscriber station sends a request for transmission, and cause the transmitter to transmit scheduling information on the first link in the communication system.

13. The apparatus as claimed in claim 12, wherein the set of instructions executable by the processor to cause the transmitter to transmit data on a first link in the communication system comprises a set of instructions executable by the processor to cause the transmitter to transmit the scheduling information together with the transmitted data on the first link in the communication system.

14. An apparatus for scheduling transmission on a link in a communication system, comprising:
    a transmitter configured to transmit data on a first link in the communication system;
    a processor; and
    a storage medium coupled to the processor and containing a set of instructions executable by the processor to determine a transmission schedule to transmit data based on a forthcoming event for at least one subscriber station due for a transmission of the data, before the subscriber station sends a request for transmission, and to schedule transmission on the link in the communication system in accordance with a reception of the transmitted data on a first link.

15. The apparatus as claimed in claim 14, wherein the set of instructions executable by the processor to schedule transmission on the link in the communication system in accordance with a reception of the transmitted data on a first link comprises a set of instructions executable by the processor to schedule transmission on the link in the communication system at a time instance delayed by a pre-determined amount from a time instance of the reception of the transmitted data on the first link.

16. The apparatus as claimed in claim 14, further comprising:
   a second processor; and
   a second storage medium coupled to the second processor and containing a set of instructions executable by the second processor to ascertain the link capacity at a base station expecting the scheduled transmission on the link in the communication system in accordance with the reception of the transmitted data on the first link; and cause the transmitter to transmit, on the first link in the communication system, a change to at least one parameter of the scheduled transmission when the ascertained link capacity does not support the scheduled transmission.

17. The apparatus as claimed in claim 16, wherein the set of instructions executable by the second processor to cause the transmitter to transmit, on the first link in the communication system, a change to at least one parameter of the scheduled transmission when the ascertained link capacity does not support the scheduled transmission comprises a set of instructions to cause the transmitter to transmit, on the first link in the communication system, a change to at least one parameter of the scheduled transmission together with the transmitted data.

18. An apparatus for scheduling transmission on a link in a communication system, comprising:
   a processor;
   a storage medium coupled to the processor and containing a set of instructions executable by the processor to ascertain the link capacity at a base station expecting transmission of a pre-scheduled data on the link wherein a transmission schedule to transmit the data based on a forthcoming event of at least one subscriber station due for a transmission of the data, before the subscriber station sends a request for transmission, and proceed in accordance with the ascertained link capacity.

19. The apparatus as claimed in claim 18, further comprising a transmitter, wherein the set of instructions executable by the processor to proceed in accordance with the ascertained link capacity comprises a set of instructions executable by the processor to abstain from transmitting scheduling information on a first link when the ascertained link capacity supports the pre-scheduled transmission of data.

20. The apparatus as claimed in claim 19, wherein the set of instructions further comprises a set of instructions executable by the processor to cause the transmitter to transmit re-scheduling information on the first link when the ascertained link capacity does not support the pre-scheduled transmission of data.

21. The apparatus as claimed in claim 18, further comprising a transmitter, wherein the set of instructions executable by the processor to proceed in accordance with the ascertained link capacity comprises a set of instructions executable by the processor to cause the transmitter to transmit authorization for the pre-scheduled transmission of data on a first link when the ascertained link capacity supports pre-scheduled transmission of data.

22. The apparatus as claimed in claim 21, wherein the set of instructions further comprises a set of instructions executable by the processor to cause the transmitter to transmit re-scheduling information on the first link when the ascertained link capacity does not support the pre-scheduled transmission of data.

23. A apparatus for scheduling transmission on a link in a communication system, comprising:
   means for ascertaining the link capacity at a base station expecting a pre-scheduled transmission of data on the link wherein a transmission schedule to transmit the data is based on a forthcoming event of at least one subscriber station due for a transmission of the data, before the subscriber station sends a request for transmission; and
   means for proceeding in accordance with said ascertained link capacity.

24. The apparatus as claimed in claim 23, further comprising:
   means for abstaining from transmitting scheduling information on a first link when said ascertained link capacity supports the pre-scheduled transmission of data.

25. The apparatus as claimed in claim 24 further comprising:
   means for transmitting re-scheduling information on a first link when said ascertained link capacity does not support the pre-scheduled transmission of data.

26. The apparatus as claimed in claim 23, wherein said proceeding comprises:
   means for transmitting, on the first link, authorization for the pre-scheduled transmission of data when said ascertained link capacity supports the pre-scheduled transmission of data.

27. The apparatus as claimed in claim 26 further comprising:
   means for transmitting re-scheduling information on the first link when said ascertained link capacity does not support the pre-scheduled transmission of data.

* * * * *